(12) United States Patent
Wee et al.

(10) Patent No.: US 9,317,107 B2
(45) Date of Patent: Apr. 19, 2016

(54) MULTI-USER DISPLAY SYSTEMS AND METHODS

(75) Inventors: Susie Wee, Palo Alto, CA (US); Andrew J Patti, Cupertino, CA (US); Mark C Solomon, San Jose, CA (US); Glenn A Wong, Foster City, CA (US); April Slayden Mitchell, San Jose, CA (US); Qi-Bin Sun, Shanghai (CN); Zhi-Shou Zhang, Shanghai (CN)

(73) Assignee: Hewlett-Packard Development Company, L.P., Houston, TX (US)

( * ) Notice: Subject to any disclaimer, the term of this patent is extended or adjusted under 35 U.S.C. 154(b) by 150 days.

(21) Appl. No.: 14/118,953

(22) PCT Filed: Jun. 30, 2011

(86) PCT No.: PCT/US2011/042632
§ 371 (c)(1),
(2), (4) Date: Nov. 20, 2013

(87) PCT Pub. No.: WO2013/002804
PCT Pub. Date: Jan. 3, 2013

(65) Prior Publication Data
US 2014/0267017 A1    Sep. 18, 2014

(51) Int. Cl.
*G06F 3/00* (2006.01)
*H04N 13/04* (2006.01)

(52) U.S. Cl.
CPC ............ *G06F 3/005* (2013.01); *H04N 13/0404* (2013.01); *H04N 13/0447* (2013.01); *H04N 13/0468* (2013.01); *H04N 13/0477* (2013.01); *H04N 2013/0463* (2013.01)

(58) Field of Classification Search
CPC ................ G06F 3/005; G02B 27/2214; G02B 27/2264; H04N 13/0454; H04N 13/0447; H04N 13/0404; H04N 13/0468

USPC .............. 345/1.1, 7, 156; 348/55–58; 349/15; 353/7
See application file for complete search history.

(56) References Cited

U.S. PATENT DOCUMENTS

| 2003/0080931 A1* | 5/2003 | Chen et al. ..................... 345/88 |
| 2004/0085519 A1* | 5/2004 | Dubin et al. .................... 353/69 |

(Continued)

FOREIGN PATENT DOCUMENTS

| JP | 6075735 | 9/1994 |
| JP | 2008065374 | 3/2008 |

OTHER PUBLICATIONS

Morales-Aranda, et al. A context sensitive public display for adaptive multi-user Information visualization. Research Paper Publication Date Jun. 19, 2007.

(Continued)

*Primary Examiner* — Amare Mengistu
*Assistant Examiner* — Stacy Khoo
(74) *Attorney, Agent, or Firm* — HP Inc. Legal Dept (57) ABSTRACT

Image display systems and methods are provided. A plurality of pixel groups, each including a plurality of independent pixels, forms a display. A plurality of lenses ($125_{1-N}$) forming an optical array and aligned along at least one axis (130), can be disposed proximate the display. Each of the plurality of lenses can provide a limited viewing arc ($150_{1-N}$) for each of the plurality of independent pixels. A sample system can also include a detector (160) to detect the presence and location of a first user (165) and a second user (170) and logic (175), that when executed by a processor (180) coupled to the display, routes a first display signal ($145_1$) based upon the viewing arc of a first portion of pixels; and routes a second display signal ($145_2$) based upon the viewing arc of a second portion of pixels.

15 Claims, 5 Drawing Sheets

(56) References Cited

U.S. PATENT DOCUMENTS

| | | |
|---|---|---|
| 2004/0218036 A1 | 11/2004 | Boss |
| 2006/0279567 A1 | 12/2006 | Schwerdtner et al. |
| 2007/0171525 A1* | 7/2007 | Miller et al. .................. 359/467 |
| 2007/0188667 A1 | 8/2007 | Schwerdtner |
| 2008/0037120 A1 | 2/2008 | Koo et al. |
| 2008/0068720 A1* | 3/2008 | Shigemura et al. ........... 359/628 |
| 2008/0204548 A1* | 8/2008 | Goulanian et al. ............. 348/51 |
| 2009/0046222 A1* | 2/2009 | Miner et al. .................... 349/69 |
| 2009/0141895 A1 | 6/2009 | Anderson et al. |
| 2011/0199468 A1* | 8/2011 | Gallagher et al. ............. 348/59 |

OTHER PUBLICATIONS

Shoemaker, Garth. Supporting Private Information on Public Displays. Research Paper. Simon Fraser University.

International Search Report. Mail Date Feb. 27, 2012. PCT/US2011/042632. Filing Date Jun. 30, 2011.

\* cited by examiner

MULTI-USER DISPLAY SYSTEMS AND METHODS

BACKGROUND OF THE INVENTION

Description of the Related Art

Display systems supporting multiple user interaction continue to grow in size and popularity. These display systems can simultaneously provide multiple users with the ability to interact with a computing device. At times a user may wish to view a private display image, for example an e-mail or bank account information; however the proximity of others may deter the user from accessing the data on a multi-user display. At other times, the presence of multiple users may actually deter some from using the display device entirely.

BRIEF DESCRIPTION OF THE DRAWINGS

Advantages of one or more disclosed embodiments may become apparent upon reading the following detailed description and upon reference to the drawings in which.

DETAILED DESCRIPTION

Display systems adapted to provide image data to a plurality of users continue to increase within the commercial and retail sectors. These display systems can range from simple, display-only, systems such as a flight information display in an airport to complex interactive systems providing multiple users the ability to simultaneously access image data from multiple sources.

In conjunction with the increase in multiple user display systems, interest in data privacy also continues to follow an upward arc. Concerns over data privacy may inhibit some users from accessing private image data on a multi-user display system. Other users may avoid using a multi-user display system altogether in response to the concern over data privacy. Providing a multi-user display system where the privacy of each user's display data is accommodated can improve the public acceptance and use of such systems.

Image display systems are therefore provided. An example system can include a plurality of pixel groups forming a display, each of the plurality of pixel groups including a plurality of independent pixels. The system can also include an optical array disposed proximate the display, the optical array including a plurality of lenses aligned along at least one axis. Each of the plurality of lenses providing a limited viewing arc for each of the plurality of independent pixels. The system can also include a detector to detect the location of a first user and a second user. The system can also include logic, that when executed by a processor coupled to the display routes a first digital data stream viewable only to the first user to the pixels within a first portion of the plurality of pixel groups based upon the viewing arc of the pixels and the location of the first user. The logic can further route a second digital data stream viewable only to the second user to the pixels within a second portion of the plurality of pixel groups based upon the viewing arc of the pixels and the location of the second user.

Another example system can include a plurality of viewing arcs formed by the passage of a plurality of image signals through an optical ray. The optical array can include a plurality of lenses disposed proximate a display device. Each of the plurality of image signals can be viewable within one of the plurality of viewing arcs. The system can also include a detection device to detect the presence and position of a plurality of users proximate the display device. The system can further include logic which when executed by a processor coupled to the detection and display devices provides a first visible image to a first viewing arc selected from the plurality of viewing arcs and provides a second visible image to a second viewing arc selected from the plurality of viewing arcs. The first viewing arc can be selected at least in part based upon the position of a first user, the first user requesting the first visible image and the second viewing arc selected at least in part based upon the position of a second user, the second user requesting the second visible image.

Image display methods are also provided. An example method can include disposing a plurality of lenses forming an optical array proximate a plurality of pixels forming a display. The plurality of pixels can be apportioned to form a plurality of pixel groups. Each of the pixels can be viewable through one of a plurality of viewing arcs formed by each of the plurality of lenses. The method can further include converting a first image signal to a first visible image using at least a first portion of the plurality of pixels and converting a second image signal to a second visible image using at least a second portion of the plurality of pixels. The first visible image can be displayed in a first viewing arc selected from the plurality of viewing arcs. The second visible image can be displayed in a second viewing arc selected from the plurality of viewing arcs.

As used herein, the terms "display" and "display device" can refer to any electronic device suitable for the display of output. Such display devices can include single display devices or monitors of any size or geometric configuration. Such display devices can equally refer to multiple display devices or monitors logically grouped to form a single, unified, display device, an example multiple display device can include, but are not limited to, large interactive devices (LIDS) comprised of multiple monitors grouped to provide a single interactive display adapted for simultaneous use by multiple users.

Figure 1:
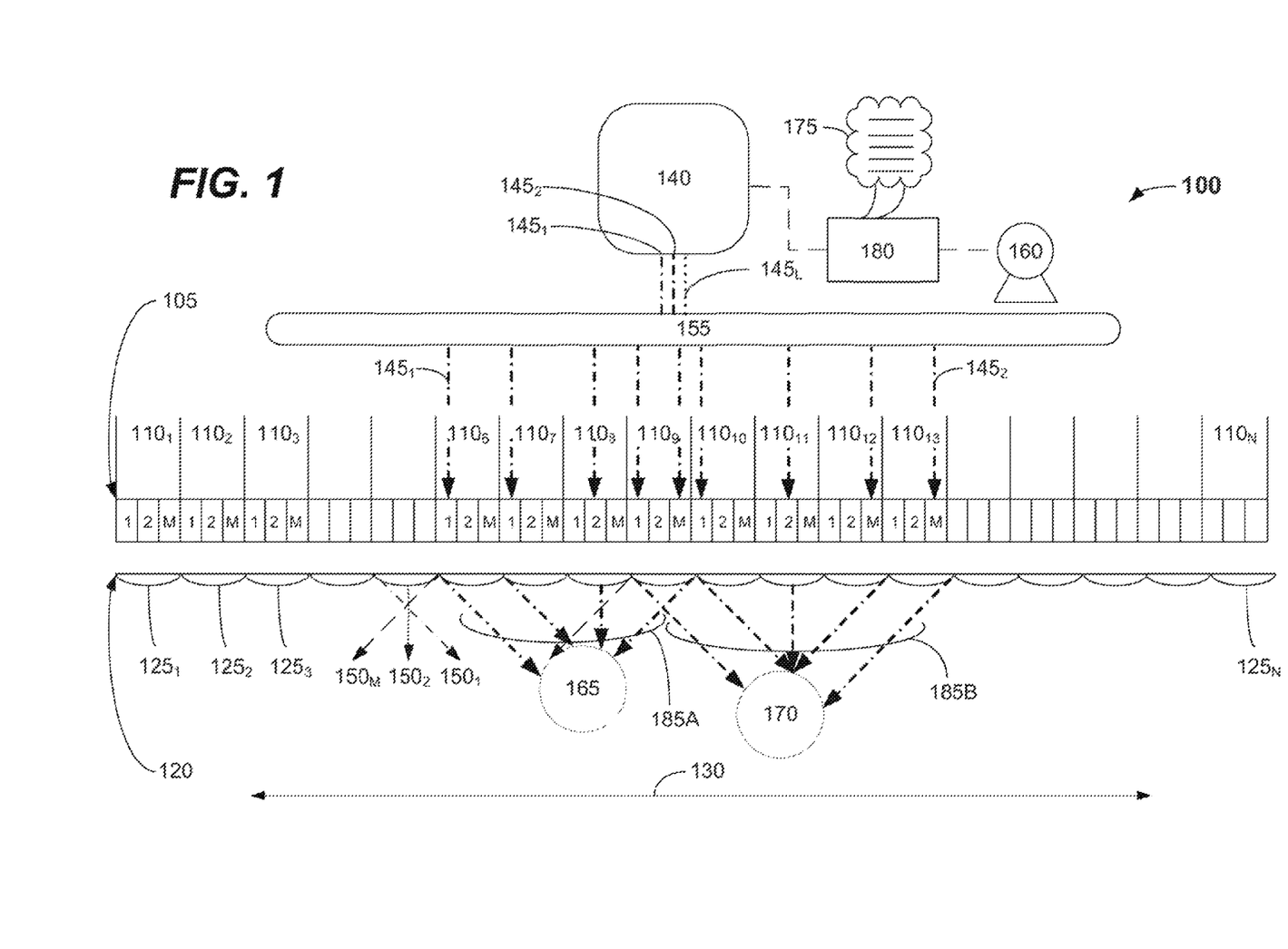
FIG. 1 is a schematic depicting an example image display system, according to one or more embodiments described herein.

FIG. 1 is a schematic depicting an example display system 100, according to one or more embodiments. The system 100 can include a plurality of pixel groups $110_{1-N}$ each containing a plurality of pixels $115_{1-M}$, the pixel groups forming a display 105. An optical array 120, formed using a plurality of lenses $125_{1-N}$ aligned along at least one axis 130, can be disposed proximate the plurality of pixel groups $115_{1-M}$. A controller 140 capable of providing a plurality of display signals $145_{1-L}$ can be coupled, for example via a bus 155, to the plurality of pixels. The controller 140 can provide some or all of the plurality of display signals $145_{1-L}$ to at least a portion of the plurality of pixels $115_{1-M}$.

A detector 160 can be used to detect the presence and location of a plurality of users, for example a first user 165 and a second user 170 of display device 105. In some embodiments, the detector 160 can be disposed in, on, or about the display 105. The detector 160 can relay user location data to a processor 180 executing logic 175. The processor 180 can then transmit data to the controller 140 thereby causing the transmission of the plurality of display signals $145_{1-L}$ to at least a portion of the plurality of pixels $115_{1-M}$. The display signals $145_{1-L}$ can be converted to provide a first display output 185A viewable to the first user 165 and a second display output 185B viewable to the second user 170. By extension, using a similar detection and display signal routing $145_{1-L}$ based upon viewing arcs, private display output 185 can be provided to any number of users.

A plurality of pixels $115_{1-M}$ can form each of the plurality of pixel groups $110_{1-N}$. In turn, each of the plurality of pixel groups $110_{1-N}$ can be proximate and associated with one of the lenses $125_{1-N}$ forming the optical array 120. Using the sample nomenclature of FIG. 1, pixels $115_{1-M}$ forming pixel group $110_N$ can be disposed proximate and associated with lens $125_N$ within the optical array 120. In some embodiments, each cylindrical lens or lenticule 125 forming a cylindrical lenticular array 120 can have a width or pitch. The width of each pixel group $110_N$ can be similar to or identical with the width or pitch of each of the lenses or lenticules 125 forming the optical array 120.

Each lens 125 forming the optical array 120 can have similar or dissimilar optical properties. The properties of each lens can include, but are not limited to, the radius of curvature of the lens; the lens thickness; the lens substrate thickness; and the lens index of refraction. The properties of each lens $125_N$ forming the optical array 120 make possible the refraction of the display output of each of the pixels $115_{1-M}$ within a specific viewing arc $150_{1-M}$. Since each pixel 115 within each pixel group 110 is individually addressable by the controller 140, a unique display output 185A, 185B can be generated for each of a plurality of users 165, 170 proximate the image display system 100.

Each of the plurality of pixel groups $110_{1-N}$ can include the same or a different number of pixels 115. Each of the pixel groups $110_{1-N}$ can be proximate and associated with a lens 125 within the optical array 120. Given the ability of the lens 125 to refract light incident upon the side of the lens proximate the display light from the pixel 115 striking the lens), the display output 185 can be effectively directed into a different, unique, viewing arc $150_{1-M}$ based upon the pixels 115 used to provide the display output. For example, where three pixels $115_{1,2,3}$ are disposed proximate the lens $125_N$, the display output from each of the pixels $115_{1,2,3}$ can appear in three distinct viewing arcs $150_{1,2,3}$; the display output from $115_1$ appearing in viewing arc $150_1$; the display output from $115_2$ appearing in viewing arc $150_2$; and the display output from $115_3$ appearing in viewing arc $150_3$. In a similar manner, the display output of any number of pixels $115_M$ can appear in any number of viewing arcs $150_M$, based upon the optical properties of lens 125.

The pixels 115 forming the pixel groups 110 can include any type of device or system capable of producing a display output. Examples can include, but are not limited to, cathode ray tube (CRT) phosphors, backlit liquid crystal displays (LCDs), light emitting diode (LED) displays, gas plasma displays and the like. Within this context, any current or future display output producing device can be used with equal efficiency. The pixels $115_{1-M}$ forming each of the pixel groups $110_{1-N}$ can be individually addressable by the controller 140. Each of the pixel groups $110_{1-N}$ can have the same number of pixels $115_{1-M}$ arranged in any geometric configuration, sample geometric configurations include, but are not limited to, single dimension (linear) arrays or multi-dimensional (e.g., planar) arrays.

The optical array 120 can include any number of lenses $125_{1-N}$. The lenses $125_{1-N}$ forming the array 120 can have similar or differing optical properties, for example similar or differing refractive properties. Lenses 125 having differing optical properties may be used to form the optical array 120—for example, where pixel groups contain a dissimilar number of pixels or a different pixel geometry, the lens disposed proximate the pixel group may have optical properties that compensate for the different number of pixels or pixel geometry. In another example, lenses $125_{1-N}$ may require differing optical properties to compensate for non-linearity, curvature, or irregularities in the display surface. Although described in the context of a lenticular array for simplicity and ease of discussion, any optical array 120 capable of providing one or more known optical properties, for example a known refraction pattern, can be similarly employed as described herein.

In some embodiments, the optical array 120 can be a single-dimensional, linear, lens array having each lens aligned along a single axis, for example axis 130 as depicted in FIG. 1. In some embodiments, the single-dimensional, linear, optical array 120 can be a cylindrical or elliptical lenticular array having each of the plurality of lenses $125_{1-N}$ forming the array 120 aligned along a single axis 130. Where the plurality of lenses $125_{1-N}$ is aligned along a single axis, the plurality of viewing arcs $150_{1-M}$ can include a series of one-dimensional viewing arcs coincident with the single axis, for example a horizontal axis 130 parallel to the horizontal plane of the display 105.

In other embodiments, the optical array 120 can be a multi-dimensional, planar, lens array having each lens aligned along two or more axes, for example along a horizontal axis 130 and along a vertical axis (not shown in FIG. 1). In some embodiments, the multi-dimensional, planar, optical array 120 can be a spherical lenticular array having each of the plurality of lenses $125_{1-N}$ forming the array aligned along two orthogonal axes. Where the plurality of lenses $125_{1-N}$ is aligned along two orthogonal axes, the viewing arcs $150_{1-M}$ can include a series of two-dimensional viewing arcs coincident with the two orthogonal axes.

The controller 140 an include any integrated or dedicated controller suitable for providing a one or more video or graphical display signals $145_{1-L}$ to at least a portion of the plurality of pixels $115_{1-M}$ forming the display 105. The controller 140 can include, for example a dedicated Graphics Processing Unit (GPU) or a graphical processor integrated within a Central Processing Unit (CPU) package. In some embodiments, the controller 140 can be a discrete device coupled to a processor 180, for example a GPU coupled via a Northbridge controller to a CPU, or a GPU coupled directed to a CPU such as featured in Intel® "Sandy Bridge" series CPUs. In at least some embodiments, the processor 180 can execute in whole or in part a machine executable instruction set or logic 175 to appropriately route the one or more display signals $145_{1-L}$ to at least a portion of the plurality of pixels $115_{1-M}$ forming the display 105. In other embodiments, although not depicted in FIG. 1 the machine executable instruction set 175 can be executed in whole or in part within the controller 140. In at least some embodiments, the one or more display signals $145_{1-L}$ generated by the controller 140 can be at least partially routed to the pixels 115 via a video or graphics bus 155.

Presence and location detection of the first user 165 and the second user 170 permits delivery of display signals $145_{1-L}$ to the appropriate pixels $115_{1-M}$ on the display device 105 such that the display output 185 is fully viewable only to the intended user. A detector 160 can be coupled to the processor 180 to provide presence and location detection functionality. The detector 160 can include one or more sensors disposed in, on, or about the display device 105. Any current or future developed detector 160 permitting the presence and location detection of one or more users proximate the display 105 can be used.

In some embodiments, the detector 160 can include one or more radio frequency presence and location detection devices to enable the precise triangulation of one or more users of the display device 105. In some embodiments, the detector 160 can include one or more infrared or ultrasonic presence and location detection devices to enable the precise triangulation of one or more users of the display device 105. In yet other embodiments, the detector 160 can include one or more remote devices, for example external video, infrared, thermal, or pressure sensitive presence and location detection devices. In some embodiments, the presence and location of some or all of the users can be determined based upon an interaction between the user and the device (e.g., a user "logs in" to the device, thereby providing, both location and identity information). In other embodiments, presence and location of at least a portion of the users can be detected based upon the interaction between an active or passive electronic device carried by the user and the display device 100 (e.g., an electronic device carried by the user and uniquely identifying the user couples to a receiver or transceiver disposed within the display device 100). Combinations of detectors 160 as described above are also possible.

Referring again to FIG. 1, display signal $145_1$ can contain private data $145_1$ intended solely for viewing by the first user 165. After detecting the presence and location of the first user 165, such as by detecting a login unique to the first user 165, the detection sensor can transmit positional data for the first user 165 to the processor 180. Logic 175 executed by the processor 180 can map the positional data to a set of pixels 115 viewable only to the first user 165 through the lenticular array 120. Referring to FIG. 1 as an example, the processor 180 can indicate that pixel $115_1$ in group $110_6$; pixel $115_1$ in group $110_7$; pixels $115_2$ and $115_M$ in group $110_8$; and pixel $115_1$ in group $110_9$ all lie within an arc or arcs 150 viewable only by the first user 165. The controller 140 can route a display signal $145_1$ unique to the first user 165 to each of the listed pixels, thereby providing a display output 185A viewable by the first user 165.

Continuing to refer to the example in FIG. 1, a second user 170 can access a second private display signal $145_2$. As with the first user 165, after detecting the position of the second user 170, logic 175 executed by processor 180 can map the positional data to a set of pixels 115 viewable only to the second user 170 through the lenticular array 120. Referring back to FIG. 1 as an example, the processor 180 can indicate that pixel $115_1$ in group $110_9$; pixel $115_1$ in group $110_{10}$; pixel $115_2$ in group $110_{11}$; and pixel $115_M$ in group $110_{13}$ all lie within an arc or arcs 150 viewable only by the second user 170. The controller 140 can route a display signal $145_2$ unique to the second user 170 to each of the listed pixels, thereby providing display output 185B viewable only by the second user 170.

Note that different display signals 145 can be routed to individual pixels 115 within a single pixel group 110 (e.g. pixels $115_1$ and $115_M$ in group $110_9$) and the resultant display output 185 from the single pixel group 110 can be privately viewed by different users due to the refractive properties of the optical array 120.

Figures 2, 2A:
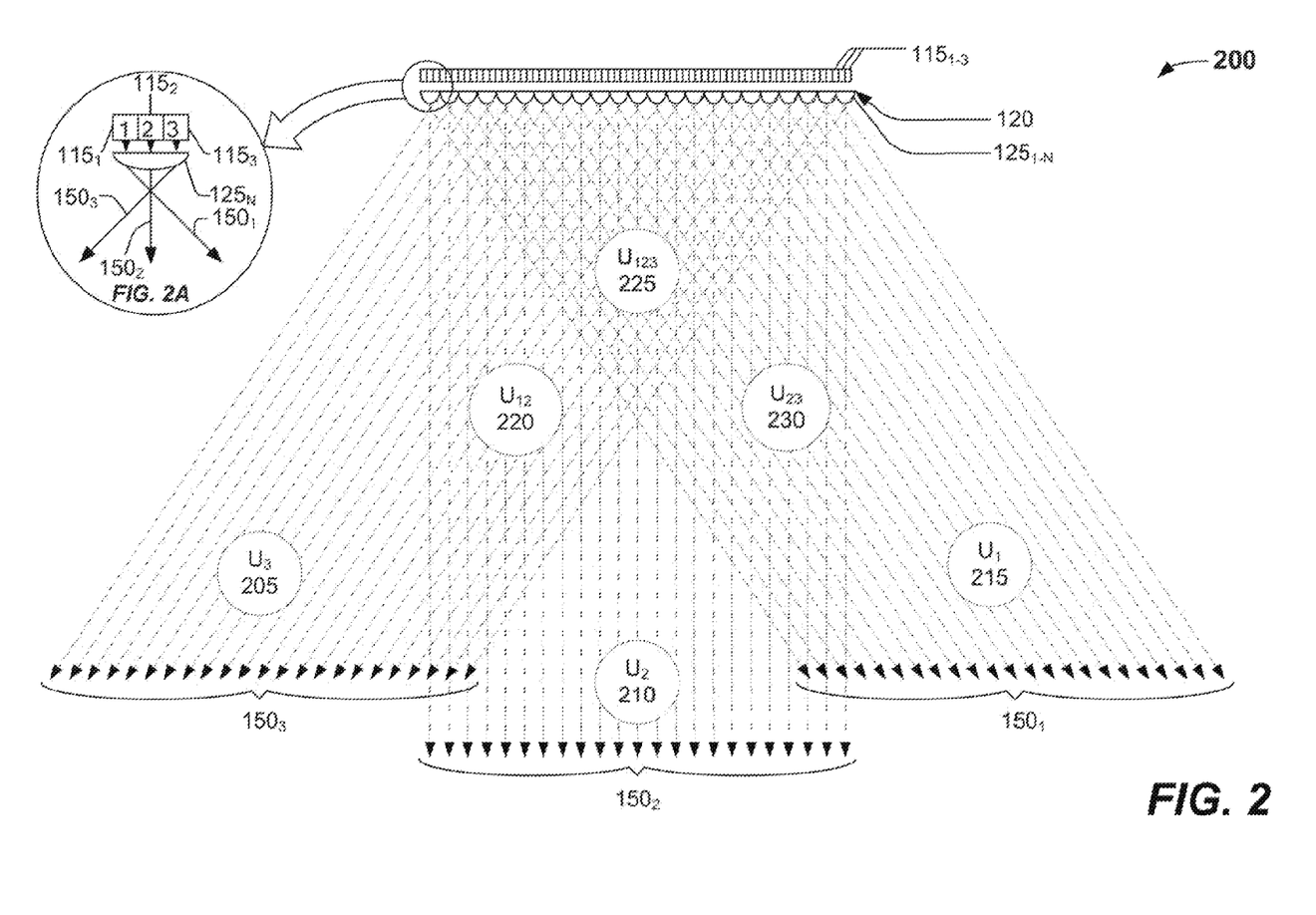
FIG. 2 is a schematic depicting another example image display system, according to one or more embodiments described herein.

FIG. 2 is a schematic depicting another example image display system 200, according to one or more embodiments. FIG. 2 provides an example system depicting the various viewing "zones" that can be formed based upon the viewing angles $150_{1-M}$ provided by the optical array 120. For illustrative purposes and for ease of discussion, the image display system 200 depicted in FIG. 2 uses sample pixel groups 110 containing three pixels, $115_{1-3}$, for each lens 125 forming the optical array 120.

As depicted in the FIG. 2A close-up detail view, display output exiting the pixels $115_{1-3}$ enters the lens $125_N$. Within the lens $125_N$, the display output from each of the pixels $115_{1-3}$ is refracted to a viewing angle $150_{1-3}$ (respectively).

Referring back to the larger FIG. 2A, it can be seen that in various locations proximate the display system 100, the viewing angles $150_{1-3}$ will overlap. Users are depicted proximate the display system 100 at six representative locations, 205, 210, 215, 220, 225, and 230. At location 205 a user $U_3$ will be within only viewing arc $150_3$. Similarly, at location 210, a user $U_2$ will be within only viewing arc $150_2$, and at location 215 a user $U_1$ will be within only viewing arc $150_1$. Thus, at location 205, a display signal 145 supplied only to pixels $115_3$ will be visible to $U_3$. In a like manner at location 210, a display signal 145 supplied only to pixels $115_2$ will be visible to $U_2$, and at location 215 a display signal 145 supplied only to pixels $115_1$ will be visible to $U_1$.

Interestingly, as the locations approach the display device 105, multiple viewing arcs $150_{1-3}$ are implicated dependent upon both the distance from, and the position relative to, the display device 105. For example, at location 220, a user $U_{12}$ will be within two viewing arcs $150_1$ and $150_2$, and the display signal 145 for $U_{12}$ will require at least a portion of pixels $115_1$ and at least a portion of pixels $115_2$. Similarly at location 230, a user $U_{23}$ will also be within two viewing arcs $150_2$ and $150_3$, and the display signal 145 for $U_{23}$ will require at least a portion of pixels $115_2$ and at least a portion of pixels $115_3$. At location 225, a user $U_{123}$ will be within three viewing arcs $150_1$, $150_2$, and $150_3$, and the display signal 145 for $U_{123}$ will require at least a portion of pixels $115_1$, a portion of pixels $115_2$, and at least a portion of pixels $115_3$.

Figure 3:
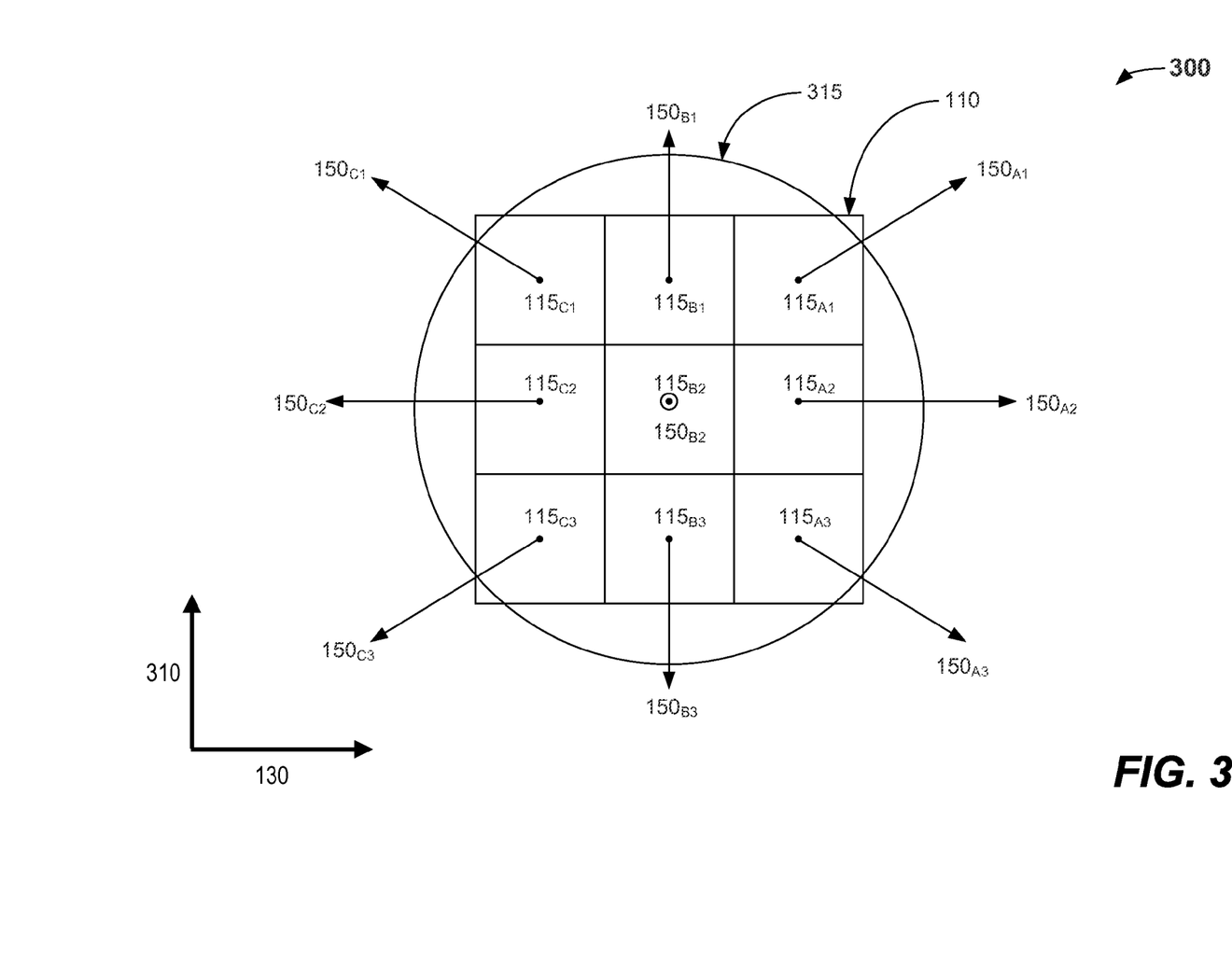
FIG. 3 is a schematic depicting an example elliptical lens for use with an image display system, according to one or more embodiments described herein.

FIG. 3 is a schematic depicting an example elliptical lens 300 for use with an image display system, according to one or more embodiments. Heretofore, the discussion has involved an optical array 120 having lenses 125 disposed along a single axis 130. However, the optical array 120 may also include arrays having lenses 125 disposed along multiple axes, for example along two orthogonal axes such as a horizontal axis 130 and a vertical axis 310 parallel to plane of the display 105. Such multiple axis arrays may, in certain embodiments, be referred to as a spherical lenticular array. FIG. 3 depicts one example of a spherical lens 315 suitable for use in an optical array 120. The spherical lens 315 can direct the display output from the pixels $115_{A1-C3}$ disposed proximate the lens in multiple viewing arcs $150_{A1-C3}$ oriented, horizontally, vertically, or any combination of horizontally and vertically.

FIG. 3 depicts a spherical lens 315 disposed proximate a pixel group 110 containing nine pixels $115_{A1-C3}$. In some embodiments, the display output from each of the pixels $115_{A1-C3}$ can be refracted by the spherical lens 315 in multiple viewing arcs, $150_{A1-C3}$. Note that the use of a two-axis optical array 120, enables the display of private images along both horizontal and vertical axes. Thus private content can be displayed to users based upon the distance from the display device 105, as well as the horizontal and vertical location of the user relative to the display device 105.

Figure 4:
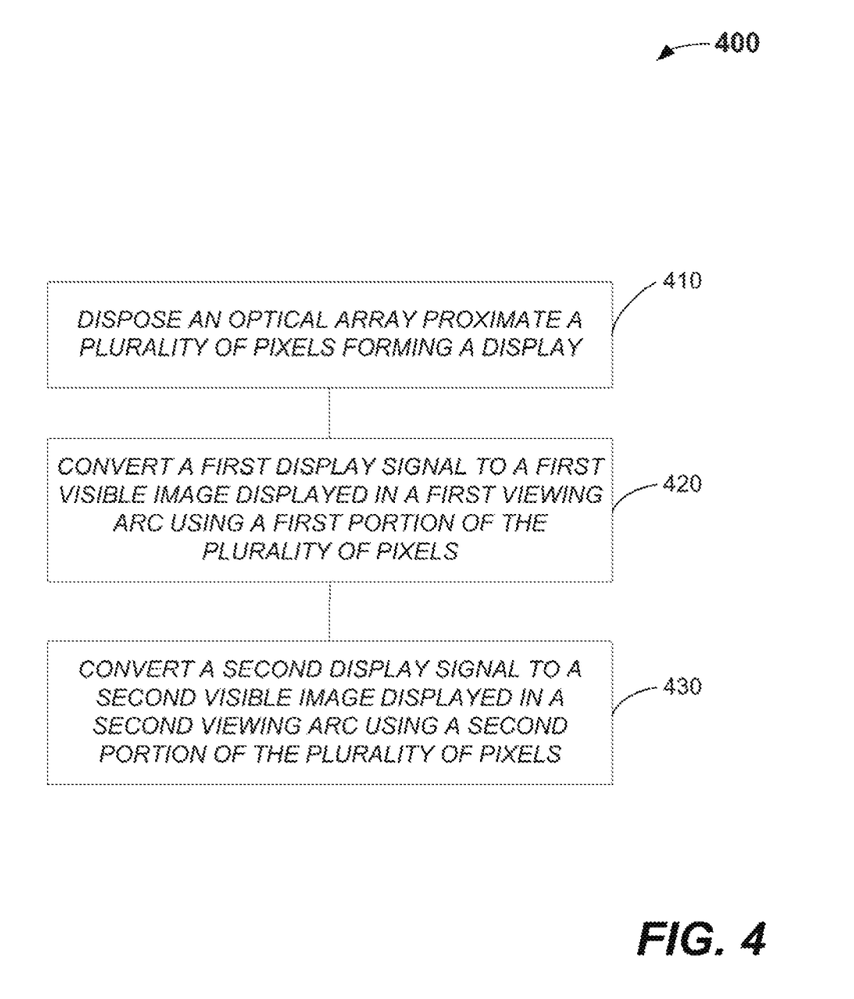
FIG. 4 is a flow diagram depicting an example image display method, according to one or more embodiments described herein.

FIG. 4 is a flow diagram depicting an example image display method 400, according to one or more embodiments.

The method 400 can include disposing a plurality of lenses $125_{1-N}$ forming an optical array 120 proximate a plurality of pixels 115 forming a display 105 at 410. The plurality of pixels $115_{1-M}$ can be apportioned to form a plurality of pixel groups 110. Each of the plurality of pixels $115_{1-M}$ can be viewable through at least one of the plurality of viewing arcs $150_{1-M}$ formed by each of the plurality of lenses $125_{1-N}$.

The method can further include converting a first display signal $145_1$ to a first display output 185A viewable in at least a first viewing arc $150_1$ using at least a first portion of the plurality of pixels $115_{1-M}$ at 420. Due to the refraction provided by the lenses $125_{1-N}$ forming the optical array 120, the first display output 185A can be displayed at least within a first viewing arc $150_1$ selected from the plurality of viewing arcs $150_{1-M}$ created by the optical array 120. By providing the first display output 185A within the first viewing arc $150_1$, the first display output 185A content is viewable only to a user located within at least the first viewing arc $150_1$.

The method can further include converting a second display signal $145_2$ to a second display output 185B viewable within a second viewing arc $150_2$ using at least a second portion of the plurality of pixels $115_{1-M}$ at 430. Due to the refraction provided by the lenses $125_{1-N}$ forming the optical array 120, the second display output 185B can be displayed within a second viewing arc $150_2$ selected from the plurality of viewing arcs $150_{1-M}$ created by the optical array 120. By providing the display output 185B within the second viewing arc $150_2$, the second display output 185B is viewable to a user located within at least the second viewing arc $150_2$. Note that the first display output 185A and the second display output 185B can be contemporaneously displayed to users located within different viewing arcs $150_{1-M}$. This functionality enables the simultaneous display of unique, private, display output 185 to multiple users via a single display device.

Figure 5:
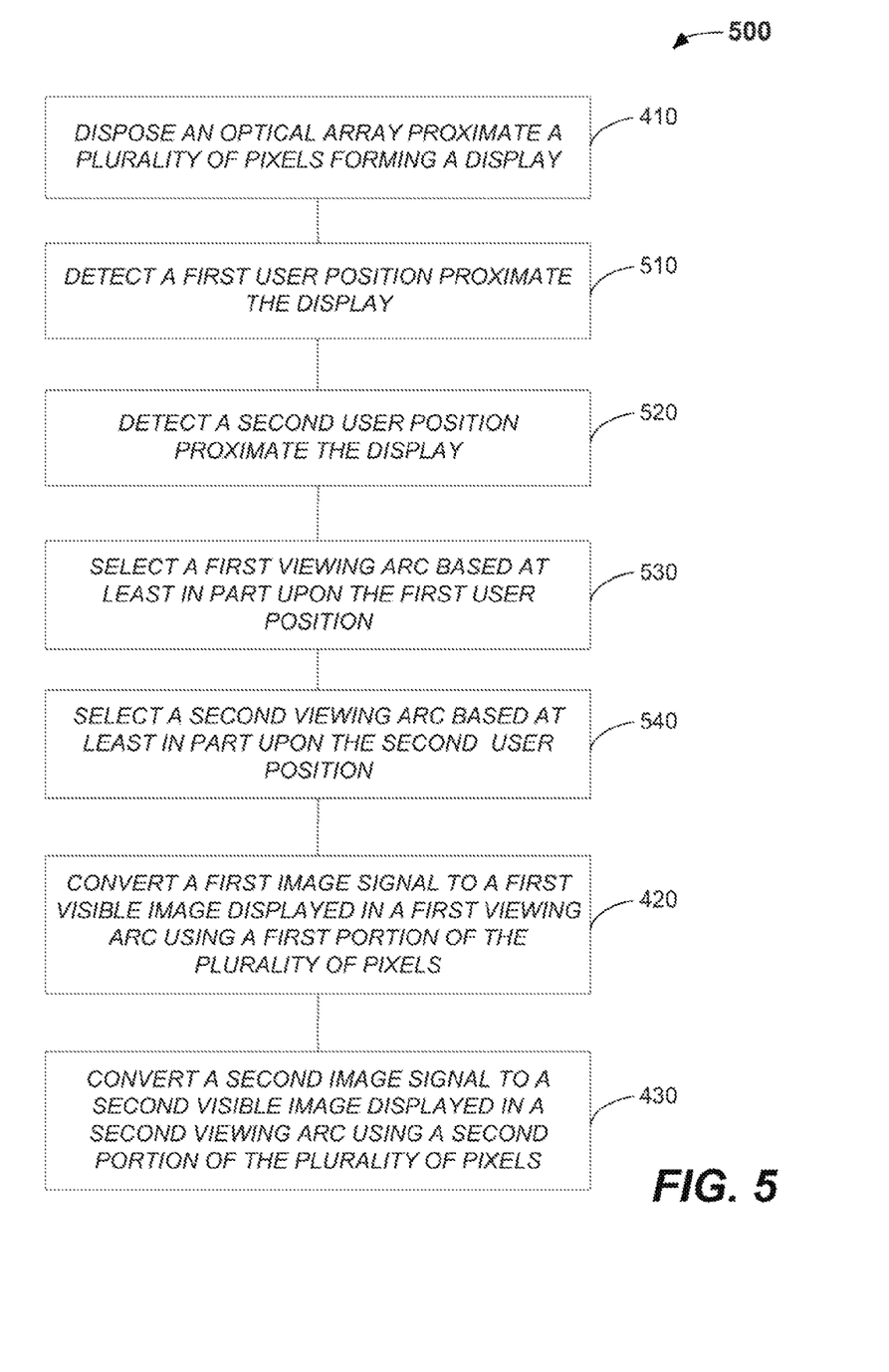
FIG. 5 is a flow diagram depicting another example image display method, according to one or more embodiments described herein.

FIG. 5 is a flow diagram depicting another example image display method 500, according to one or more embodiments. The method 500 can include detecting each of a plurality of users of the display device 105 and providing a unique display output 185 to each of a plurality of users viewing or otherwise interacting or communicating with the display device, based at least in part upon the position and location of each user with respect to the display 105.

The method 500 can include detecting a first user 165 proximate the display 105 at 510, for example through the use of one or more detectors 160 described in detail with reference to FIG. 1, above. The detection of the first user 165 can, at times, be autonomous, for example by sensing the presence of the user or an electronic device associated with the first user via the detector 160. The detection of the first user 165 can, at times, be interactive, for example by having the first user provide a credential such as a password on a touch sensitive display 105.

The method 500 can further include detecting a second user 170 proximate the display 105 at 520, for example through the use of ore or more detectors 160 described in detail with reference to FIG. 1, above. The detection of the second user 170 can be achieved either through the use of the same detector 160 used to detect the first user, or through the use of a different detector. Similar to the detection of the first user, the detection of the second user can be autonomous, for example by sensing the presence of the user or an electronic device associated with the second user via the detector 160. The detection of the second user can be interactive, for example by having the second user provide a credential such as a password on a touch sensitive display 105. In some embodiments, the detection of the first and the second users can be achieved using differing detection methods, for example an autonomous detection of the first user's RID tag and an interactive detection of the second user's password entry.

The method 500 can also include selecting the first viewing arc based, at least in part, on the location of the first user 165 at 530. The method can further include selecting the second viewing arc based, at least in part, on the location of the second user 170 at 540. As described in detail with regards to FIG. 1 above, a plurality of viewing arcs $150_{1-M}$ exist proximate the display 105. The detector 160 can identify the location of the first user 165 and the second user 170 with respect to the display 105. The location information for both users can be communicated from the detector 160 to the processor 180. Based on this location information, the processor 180 can determine the viewing arcs $150_{1-M}$ occupied by each user.

Where one or more users occupy at least one common viewing arc 150 the display output provided to the pixels forming the common viewing arc can be visible to multiple users. Since data visible to multiple users cannot be considered private, the controller 140 can inhibit the transmission of all display signals 145 to pixels 115 within the common viewing arc 150 thereby preventing the public disclosure of private data to multiple users.

The processor 180 can communicate the viewing arcs 150 for each user to the controller 140. Based on the viewing arc data provided by the processor 180, the controller 140 can determine the pixels 115 capable of providing the first display output 185A to the first user 165, and the pixels 115 capable of providing the second display output 185B to the second user 170. Thus, based upon the display content selected by each user, the controller 140 can generate the display signals $140_{1-L}$ for transmission to the appropriate pixels 115.

While the foregoing is directed to embodiments of the present invention, other and further embodiments of the invention may be devised without departing from the basic scope thereof, and the scope thereof is determined by the claims that follow.

What is claimed is:
1. An image display system comprising:
a plurality of pixel groups forming a display, each of the plurality of pixel groups including a plurality of independent pixels;
an optical array disposed proximate the display, the optical array including a plurality of lenses aligned along at least one axis;
each of the plurality of lenses providing a viewing arc for each of the plurality of independent pixels;
a detector to detect a location of a first user and a second user; and
logic, that when executed by a processor coupled to the display:
routes a first display signal viewable only to the first user to the pixels within a first portion of the plurality of pixel groups based upon the viewing arc of the pixels and the location of the first user; and
routes a second display signal viewable only to the second user to the pixels within a second portion of the plurality of pixel groups based upon the viewing arc of the pixels and the location of the second user,
wherein each pixel group has a number of pixels equal in number to a plurality of distinct user locations in which just one display signal that the display displays is viewable, and a number of the lenses is equal to a number of the pixel groups.

2. The system of claim 1,
the optical array comprising either of a cylindrical or elliptical lenticular array, with each of the plurality of lenses aligned along a single axis; and
the viewing arc consisting of a one dimensional arc coincident with the single axis.

3. The system of claim 1,
the optical array comprising a spherical lenticular array with the plurality of lenses aligned along two orthogonal axes; and
the viewing arc consisting of a two dimensional arc coincident with the two orthogonal axes.

4. The system of claim 1, the display comprising a plurality of display devices forming a large interactive device (LID), the optical array proximate the plurality of display devices.

5. The system of claim 1, each of the plurality of pixel groups consisting of a same number and configuration of independently addressable pixels.

6. An image display method, comprising:
disposing a plurality of lenses forming an optical array proximate a plurality of pixels forming a display;
the plurality of pixels apportioned to form a plurality of pixel groups;
each of the pixels viewable through one of a plurality of viewing arcs formed by each of the plurality of lenses;
converting a first display signal to a first display output using at least a first portion of the plurality of pixels;
the first display output visible in a first viewing arc selected from the plurality of viewing arcs; and
converting a second display signal to a second display output using at least a second portion of the plurality of pixels;
the second display output visible in a second viewing arc selected from the plurality of viewing arcs,
wherein each pixel group has a number of pixels equal in number to a plurality of distinct user locations in which just one display signal that the display displays is viewable, and a number of the lenses is equal to a number of the pixel groups.

7. The method of claim 6, the first viewing arc exclusive of the second viewing arc.

8. The method of claim 6, the first viewing arc at least partially exclusive of the second viewing arc.

9. The method of claim 6, the optical array comprising either of a cylindrical or elliptical lenticular array, with each of the plurality of lenses aligned along a single axis.

10. The method of claim 6, the optical array comprising a spherical lenticular array, with each of the plurality of lenses aligned along two orthogonal axes.

11. The method of claim 6, further comprising:
detecting a location of a first user proximate the display;
detecting a location of a second user proximate the display;
selecting the first viewing arc based at least in part upon the location of the first user; and
selecting the second viewing arc based at least in part upon the location of the second user.

12. The method of claim 6, each of the plurality of pixel groups consisting of a same number and arrangement of independently addressable pixels.

13. An image display system, comprising:
a plurality of viewing arcs formed by passage of a plurality of display signals through an optical array;
the optical array including a plurality of lenses disposed proximate a display device having a plurality of pixel groups, each pixel group having a number of pixels equal in number of a plurality of distinct user locations in which just one display signal that the display device displays is viewable, a number of the lenses equal to a number of the pixel groups; and
each of the plurality of display signals viewable within one of the plurality of viewing arcs;
a detection device to detect a location of at least a first user and a second user proximate the display device;
logic which when executed by a processor coupled to the detection and display devices;
provides a first display output at a request of the first user within a first viewing arc selected from the plurality of viewing arcs;
the first viewing arc selected at least in part based upon the location of the first user; and
provides a second display output at a request of the second user within a second viewing arc selected from the plurality of viewing arcs;
the second viewing arc selected at least in part based upon the location of the second user.

14. The system of claim 13,
the optical array comprising either of a cylindrical or elliptical lenticular array, with each of the plurality of lenses aligned along a single axis; and
each viewing arc consisting of a one dimensional arc coincident with the single axis.

15. The system of claim 13,
the optical array comprising a spherical lenticular array with the plurality of lenses aligned along two orthogonal axes; and
each viewing arc consisting of a two dimensional arc coincident with the two orthogonal axes.

* * * * *